United States Patent [19]

Sanders et al.

[11] 4,096,011
[45] Jun. 20, 1978

[54] METHOD OF MANUFACTURING EXTERIOR SIDING

[75] Inventors: Stanley J. Sanders, Roslyn; Vincent Fava, Massapequa, both of N.Y.

[73] Assignee: Aegean Industries, Inc., Roslyn, N.Y.

[21] Appl. No.: 749,254

[22] Filed: Dec. 10, 1976

[51] Int. Cl.² ............... B29C 17/02; B29C 17/03
[52] U.S. Cl. .................... 156/196; 52/518; 52/519; 52/528; 52/539; 52/540; 52/546; 156/242; 156/245; 156/285; 264/295; 264/296
[58] Field of Search ............... 156/196, 211, 212, 213, 156/214, 221, 223, 226, 227, 242, 245, 285; 52/518, 519, 520, 521, 524, 528, 535, 536, 537, 539, 540, 545, 546, 553, 554; 264/46.8, 90, 295, 296

[56] References Cited

U.S. PATENT DOCUMENTS

| 1,190,081 | 7/1916 | Bailey | 52/540 |
| 1,934,256 | 11/1933 | Bronson | 264/295 |
| 3,187,855 | 6/1965 | Ridder | 52/528 |
| 3,248,835 | 5/1966 | Westinel | 52/539 |
| 3,425,145 | 2/1969 | Newton | 156/212 |
| 3,897,667 | 8/1975 | Turek | 52/546 |
| 3,899,561 | 8/1975 | Heilmayr | 264/295 |
| 3,936,520 | 2/1976 | Garofalo | 264/296 |
| 3,973,783 | 8/1976 | Steets et al. | 156/212 |
| 4,015,391 | 4/1977 | Epstein et al. | 52/539 |
| 4,015,392 | 4/1977 | Raton | 52/540 |

FOREIGN PATENT DOCUMENTS

| 729,339 | 3/1966 | Canada | 52/546 |

Primary Examiner—Caleb Weston
Attorney, Agent, or Firm—Scully, Scott, Murphy & Presser

[57] ABSTRACT

A method of manufacturing an exterior facing layer for vinyl siding, including molding a pattern of depressions and protuberances into a sheet of a thermoplastic polymer simulating cedar shake shingles, and concurrently molding an extension to the molded plank incorporating an integrally molded hinge connection. Thereafter, the extension is folded over the plank edge in a mechanical bending sequence and bonded thereto. In another embodiment of the invention, a foam filler material may be poured into the molded facing layer cavities and a metallic foil backing bonded thereto so as to form a laminar siding construction.

15 Claims, 8 Drawing Figures

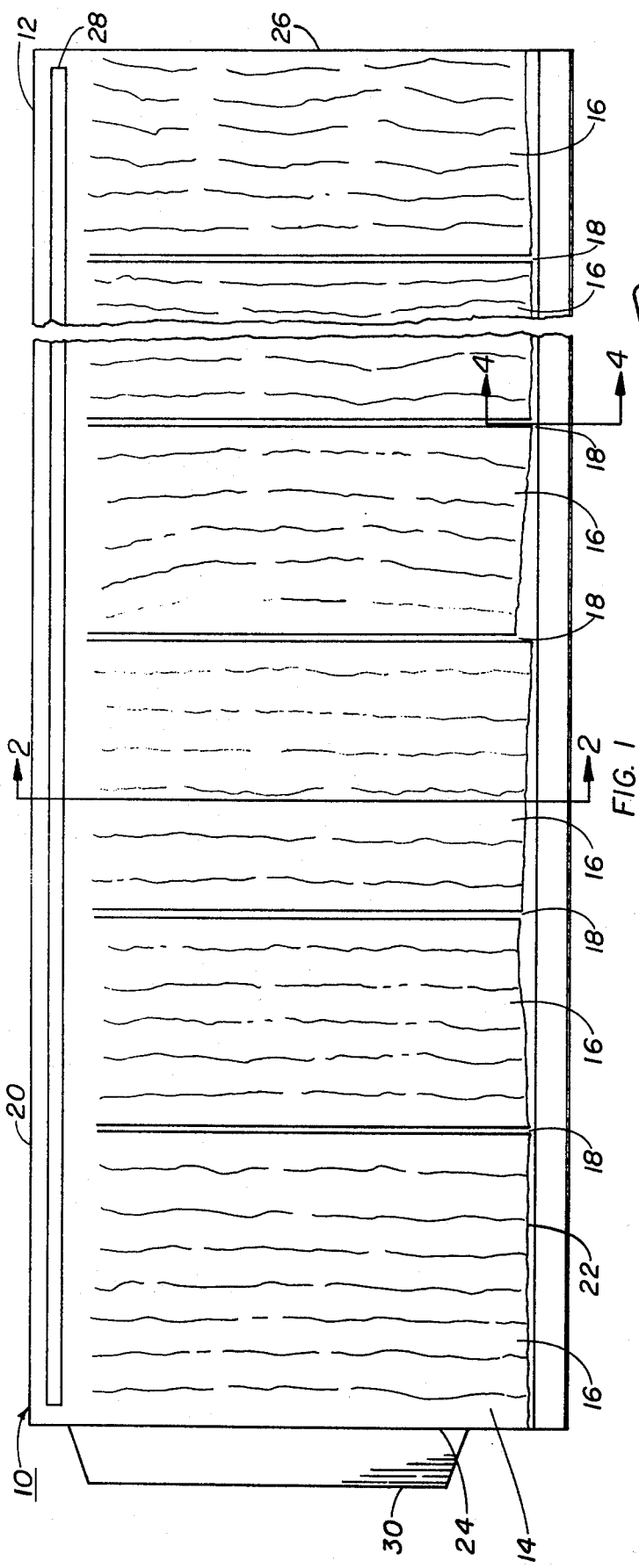
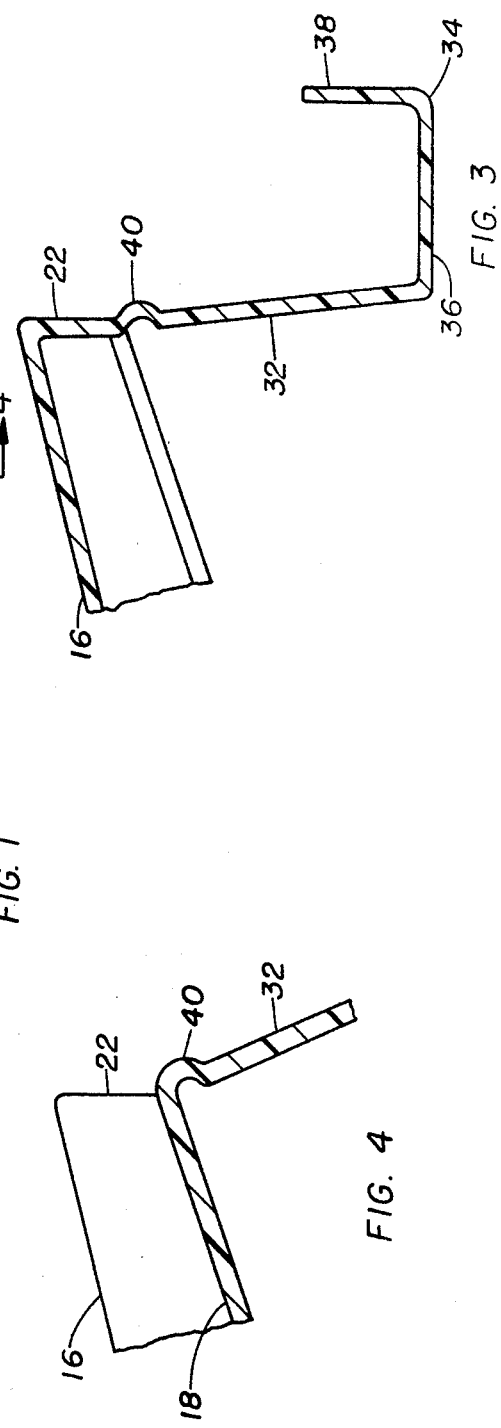

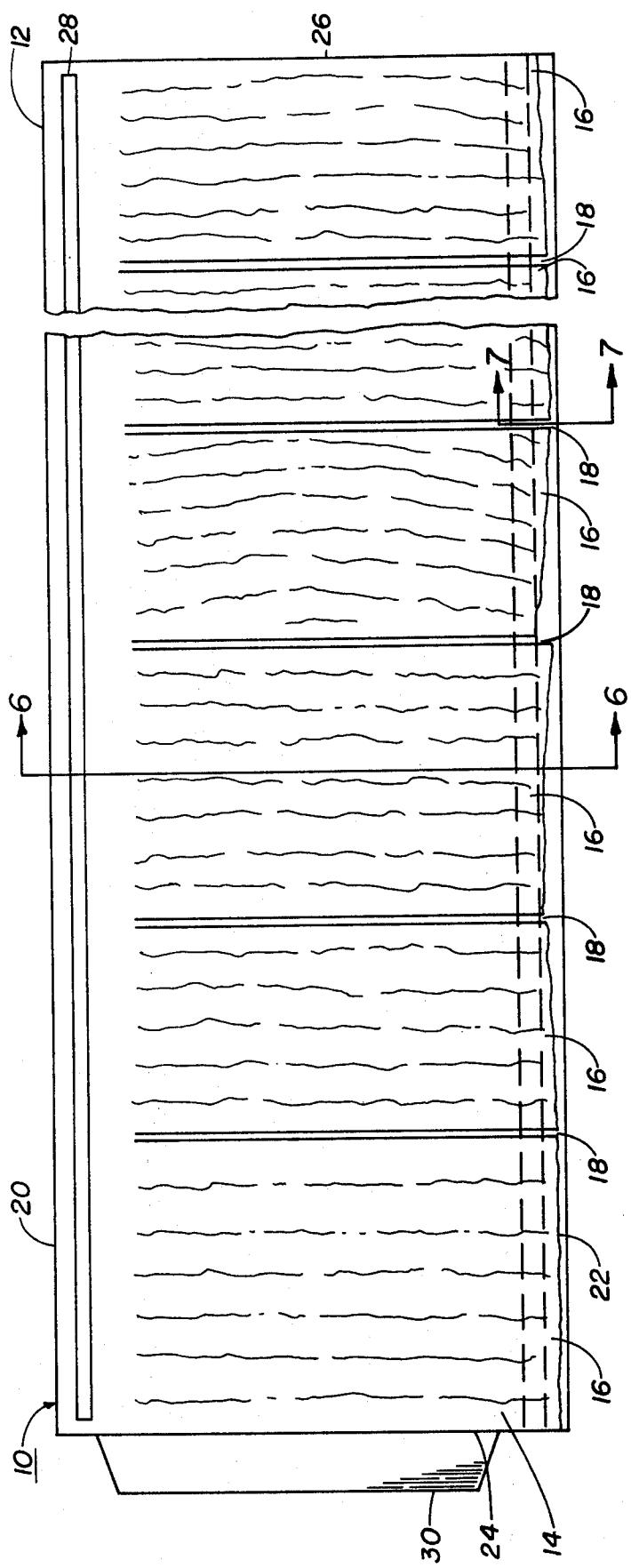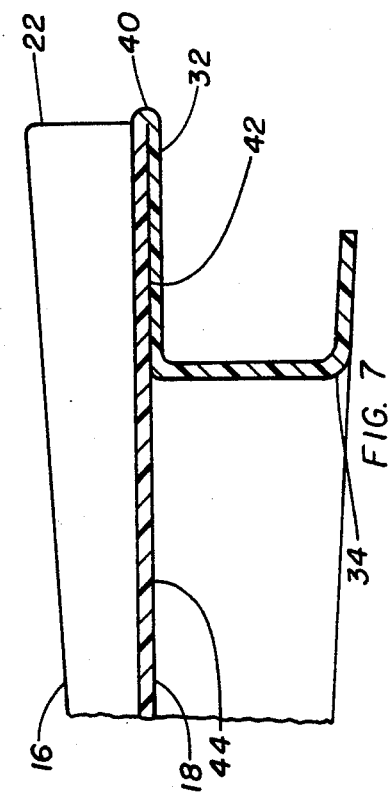

METHOD OF MANUFACTURING EXTERIOR SIDING

FIELD OF THE INVENTION

The present invention relates to home insulation and, more particularly to a method of manufacturing a decorative building structure adapted for use as exterior siding, the latter of which is characterized by substantial thermal insulation values. In essence, the invention is directed at a novel and economical method of manufacturing an outer facing layer formed of a thermoplastic polymer, and which will constitute an element of an insulating siding unit employed for home insulation.

A. Cross-Reference to Related Application

U.S. patent application Ser. No. 697,416; filed Jun. 29, 1976, U.S. Pat. No. 4,034,528, for Insulating Vinyl Siding and assigned to the common assignee of this application.

B. Background of the Invention

The significant increase in home heating expense attendant the "energy crisis" of recent years has sparked an interest in methods for enhancing the thermal insulation of building structures, especially single family residences which are often poorly or inadequately insulated as originally constructed.

Various approaches or solutions to insulation problems as currently proposed include the insertion, as by blowing or injection, of insulation material into wall or ceiling crevices and interstices, or the padding of attic flooring substructures, and the like. Most of such options offer only limited and frequently insignificant improvement in the overall level of insulation of the home because of the limited coverage possible, due to the restricted access to these spaces.

It is, accordingly, most desirable to provide a post-construction insulation technique which affords a more general and uniform improvement in building and particularly home insulation. The expense of any such operation is more easily borne when a multifunctional approach can be devised, and this is a special feature of the present invention.

Aluminum and vinyl sidings have become a popular substitute for the periodic or biennial painting of homes because of their ready cleanability and resistance to deterioration. Aluminum siding has become relatively expensive, and is inherently less resilient, hence more difficult to use in construction, thereby enhancing interest in vinyl structures which are also capable of permanent use. Such siding is easily installed around and about doors and windows and constitutes a permanent improvement in building and home value. The vinyl siding itself is of substantial thickness and, although resilient, is of substantial rigidity to satisfactory hold up under the long term usage to which it is subjected. The conventional structures which are currently in use do not offer significant insulation value.

An important aspect in the manufacture of vinyl siding lies in the provision of rapid and economical methods of manufacture thereof which will not only render such vinyl structures economically competitive with aluminum siding and other types of home insulation, but which will afford a finished siding product of extremely attractive and natural appearance endowed with a high degree of strength and longevity in use under the most adverse conditions.

C. Discussion of the Prior Art

Insulation which is constituted by foamed or molded structures simulating roofing, siding or the like, and various methods for the manufacture thereof are presently known in the art. However, problems have been encountered in satisfactorily post-forming plastic material molded structures into their final configurations in view of the introduction of lines of weakness into the material, which may result in the premature failure thereof during extended periods of use.

Thus, for instance, U.S. Pat. No. 3,936,520 discloses a process for the manufacture of plastic shutters in which the basic shutter structure is formed through a molding sequence, and wherein a post-forming or bending step is imparted to the upturned sidewalls thereof to thereby cause the latter to embrace the outer rim or edge of the molded structure through the application of heat and mechanical bending forces. This mechanical post-forming procedure, however, will create a line of weakness or reduced material thickness along the hinged portion of the shutter structure which, although possibly not of particular significance in a shutter construction, in all likelihood is not acceptable in the manufacture of plastic siding which is subjected to much higher loads and stresses during extended periods of use.

U.S. Pat. No. 1,934,256 discloses a method for the molding of a vulcanized rubber-covered metal running board, which employs a further mechanical step in the bending of the edges thereof into a final configuration subsequent to molding of the running board. However, there is no disclosure of the utilization of the novel type of hinged configuration which is integrally molded into the structure, and which will avoid the generating of bending stresses and thinning of material cross-section which may result from the final mechanical bending step.

Other U.S. Pats. such as Nos. 3,342,915; 3,392,223; 3,489,265 and 3,899,561 and its related case 3,674,388, each show various methods of molding sheets or sections of thermoplastic materials into either semi-finished or finished configurations in order to produce a commercial product. However, none of these prior art patents disclose or even suggest methods of manufacturing plastic siding for home installation, in which at least the plastic cladding or outer surface layer constituting the exterior surface of the home insulating siding structure is first formed into a semi-finished condition through a molding operation, preferably a vacuum molding sequence, and with the final configuration being thereafter imparted thereto through mechanically and reversely bending at least one of the preformed edges thereof into overlapping relationship with an edge or rim portion of the vinyl siding structure. Moreover, none of the prior art patents disclose the concept of bonding the thus mechanically bent-over edge portion of the finished structure to the surface thereof so as to maintain it in its finished configuration.

SUMMARY OF THE INVENTION

Accordingly, it is an object of the present invention to devise and implement a novel and unique method for manufacturing the plastic cladding or outer surface layer of a thermoplastic polymer siding unit adapted for home installation, which will enhance the thermal insulation of an existing building structure and, particularly, personal homes and residences.

Another object of the invention is to provide a method for manufacturing a molded thermoplastic polymer outer facing layer for insulating siding which will constitute an essentially maintenance-free decorative facing for buildings and homes, and which incorporates substantial insulation values.

A further object of the invention is the provision of a manufacturing method for an outer facing layer of a vinyl siding structure through the intermediary of a simple and inexpensive molding sequence followed by a mechanical post-forming operation to thereby construct a siding unit component adapted for long-term trouble-free utilization when employed for exterior home insulation.

Yet another object of the invention is to provide a method of manufacturing a vinyl siding structure, of the type described, which incorporates a unique integrally hinged structure facilitating the mechanical post-forming operation without subjecting the siding structure to undue bending stresses and material deformation.

A still further object of the invention is to provide a method of forming a vinyl siding structure, of the type described, which is of light weight and adapted for interengagement with like or similar siding units to thereby form a coherent moisture and thermal barrier effectively insulating the building structure on which it is mounted.

Pursuant to the invention, an essentially maintenance-free siding structure for home insulation is provided in that a thin sheet of a thermoplastic polymer material of limited rigidity or stiffness is molded into a substantially rectangular plank incorporating a decorative shake-like appearance through a predetermined pattern of molded depressions and protuberances. The semi-finished plank, which forms the outer facing layer or cladding of the siding structure includes a shaped edge portion integrally joined to the plank, which is adapted to be reversely pivoted about an integral hinge through a mechanical bending operation and bonded to surface portions of the molded plank so as to provide structure for dovetail engagement with a similar siding structure.

A foamed plastic material may be filled into the hollows of the plank and integrally bonded to the rear thereof. The laminar structure of the vinyl siding may be completed by applying an integrally bonded reflective backing layer constituted by a metallic foil.

BRIEF DESCRIPTION OF THE DRAWINGS

Reference may now be had to the following detailed description of preferred embodiments of the invention, illustrative of the novel method of manufacture thereof, and taken in conjunction with the accompanying drawings; in which:

FIG. 1 shows a top plan view of the outer facing layer structure of a siding unit manufactured pursuant to the present inventive method;

FIG. 3 is an enlarged fragmentary section of encircled detail A in FIG. 2;

FIG. 4 is an enlarged fragmentary sectional view taken along line 4—4 in FIG. 1;

FIG. 5 is a top plan view similar to FIG. 1 showing the siding outer facing layer structure shaped into its final configuration;

FIG. 7 is a sectional view taken along line 7—7 in FIG. 5; and

DETAILED DESCRIPTION OF THE INVENTION

Figure 8:
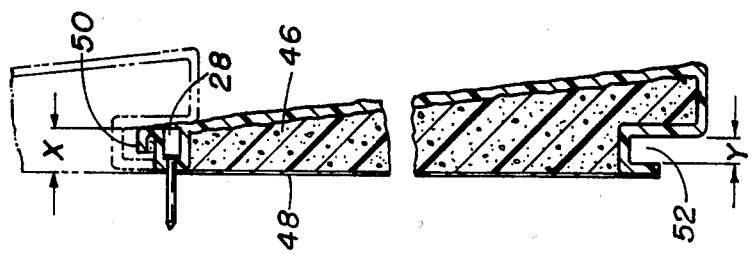
FIG. 8 is a sectional view similar to FIG. 6 showing a laminar siding structure incorporating a foam plastic filler and a metallic foil backing layer.

The siding structure 10 of the invention, which may be quite similar in construction and in the materials employed with the structure disclosed in applicant's copending U.S. patent application Ser. No. 697,416, may incorporate a generally self-supporting exterior or outer facing layer 12, shown in semi-finished form in FIG. 1 of the drawings, with the layer 12 being constituted from a thin sheet of thermoplastic polymer. The thermoplastic sheet is of substantially uniform thickness and is basically of limited rigidity or stiffness.

The thermoplastic polymer sheet is molded, preferably by means of a vacuum molding operation in a suitable molding apparatus (not shown), into a semi-finished form shown in FIG. 1 so as to produce an exterior siding surface 14 evidencing a design indicative of a plurality of adjacently spaced cedar shingles or shakes 16 of random widths which are shown to be separated by intermediate substantially parallel extending and randomly spaced grooves or surface indentations 18 formed in the facing layer 12. Alternatively viewed, the grooves 18 are formed by the shakes 16 being molded upwardly out of the plane of the thermoplastic sheet.

Figure 2:
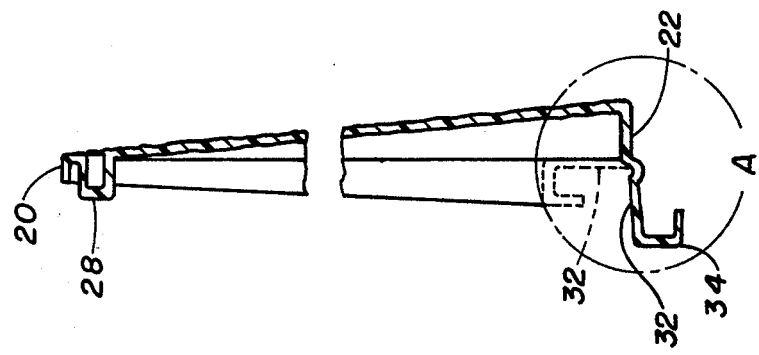
FIG. 2 is a sectional view taken along line 2—2 in FIG. 1.

As shown in greater detail in FIG. 2 of the drawings, the outer facing layer 12 for the siding is of an essentially elongate rectangular configuration in planar view extending along its edges into depending side walls or flanges 20, 22, 24 and 26, each of which imparts a stiffening effect to the entire facing layer structure. The side walls 24 and 26 each increase in height from their junctures with side wall 20 towards side wall 22, and are cut back in height shortly before adjoining the latter, as shown in FIG. 2, and described hereinbelow. Extending in close proximity to edge 20 is an elongate generally U-shaped groove 28 formed in and depending from the surface 14 and being of a length terminating just short of the side walls 24 and 26. The provision of the groove 28 further enhances the rigidity or stiffness of the outer facing layer structure along its edge 20, while concurrently forming an insert or tongue portion adapted to be dovetailed with the opposite recessed end of a similar siding structure positioned therebelow on the housing or home structure as explained in further detail hereinbelow. The end of depending flange or side wall 24 may be formed to extend into an outwardly projecting flange 30 adapted to physically engage an adjacent siding structure 10.

Referring now in detail to FIGS. 2 through 4 of the drawings, joined to and extending along the free end of depending side wall 22, as an integrally molded extension thereof, is a generally flat plate 32 angled at its free end into an elongate, generally cross-sectionally U-shaped segment 34 having a first planar bottom portion 36 and curving into second planar portion 38.

The juncture between the depending flange or side wall 22 and the flat plate 32 is inventively formed by an elongate arcuate depression 40 of integrally molded material extending along the full length between elements 22 and 32. The arcuate depression 40 is of an essentially curved or semi-circular configuration to thereby form a hinge or so called "hinge lock" facilitating pivotal movement thereabout of the plate 32 and U-shaped segment 34 relative to depending side wall 22 and to enable elements 32 and 34 to assume the position shown in phantom-lines in FIG. 2 of the drawings.

Figure 6:
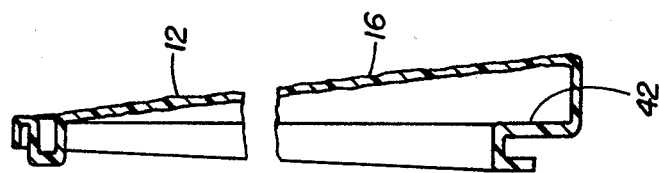
FIG. 6 is a sectional view taken along line 6—6 in FIG. 5.

In order to impart a finished configuration to the siding outer facing layer 12, as shown in FIGS. 5 through 7 of the drawings, and since the molding operation is not capable of molding overlapping wall structure without the employment of expensive molds and dies, the plate 32 including the U-shaped portion 34 is reversely rotated or pivoted about the arcuate depression or hinge 40 by the application of mechanical bending apparatus (not shown) until the surface 42 on plate 32 comes into surface-to-surface contact with the rear surfaces 44 of the indentations 18. As illustrated in FIG. 7, the side walls 24 and 26 are cut out and contoured to receive the bent-over U-shaped portion 34, to thereby allow contact between surfaces 42 and 44. Additionally, the height of the cut-out in the side walls 24, 26 is equal to the width of bottom plate 36 so as to form a continual surface with wall 38. Thereafter, preferably through the application of heat or possibly a suitable adhesive, the surfaces of 42 and 44 are bonded together to maintain them in a permanently fastened relationship. In effect, the spaced indentations 18 formulate integrally molded stiffening ribs extending transversely across the width of the plank-shaped outer facing layer 12, in parallel with edges 24 and 26, thereby imparting stiffness to the latter in one direction, while the bonding thereto of the U-shaped portion 34, and the presence of elongate groove 28 proximate the oppositely located side wall 20 of the outer facing layer 12 will impart stiffness or rigidity to the latter against bending and deformation in directions normal thereto.

As in the vinyl siding structure disclosed in U.S. Pat. No. 4,034,528, the interspaces between the transversely extending ribs formed between indentations at the rear of the layer 12, and any other exposed areas, may be filled with a suitable foam plastic material 46, such as foamed polyurethane or the like, as shown in FIG. 8 of the drawings, and may then be covered by a backing layer formed by a suitable metallic foil 48 which is bonded thereto. This will then provide a rigid laminar siding structure of high insulative values.

Obviously, rather than merely bonding the surfaces 44 and 42 of the ribs 18 and flat plate 32, it is also possible that the surface 42 of plate 32 be bonded directly to the foamed polyurethane filler as the latter is poured into the hollows of the outer surface layer 12. This, of course, will provide an intimate and permanent bond between these components of the laminated vinyl siding structure.

The plastic cladding constituting the exterior facing layer 12 may be prepared from any thermoplastic organic polymeric material, including polyolefins or polyvinyls, polycarbonates, polyacetals, polysulfones, polyesters, polyamides and the like, or mixtures thereof. The most desirable material on a cost/performance basis is polyvinyl chloride. The polymer may be and preferably is formulated to comprise coloration agents, ultraviolet stabilizers or fire retardants, as well-known in the art. Where desired, the cladding may be strengthed or stiffened by the inclusion of glass fiber, for example. Unlike vinyl emulsion coatings of essentially paint-like character, the cladding acts as a permanently decorative U.V. and moisture seal.

The thermoforming operation may be effected by any known means but for larger dimensioned pieces vacuum forming will prove most convenient. For example, a 2 × 3 foot sheet comprising two adjacent courses of cedar shake simulate, or a 1 × 6 foot sheet in a single course having a depth ranging from ⅜ to ⅝ inch, may be readily formed into a 25 – 45 mil cladding by this method.

Although any insulating low density foam may be employed as the filler, most preferably a fire retardant grade of polyurethane foam is employed, having a cured density of about 2.0 to 3.5, preferably 2.0 to 2.5 lb./ft$^2$. For the aforementioned sheet, an amount of about 1 lb. of foam is sufficient to provide an insulation equivalent to conventional fiberglass insulation employed in homes.

The filler may be poured directly into the preformed exterior face sheet and cured therein in conventional manner, and 1 mil to 3 mil thick aluminum foil backing applied thereover to complete the laminar structure. Such a procedure insures that the foam filler will conform to the geometry of the facing and be uniformly bonded thereto across the whole of the structure.

The preforming of the vinyl cladding is important to ensure faithful reproduction of the complex decorative geometry and surface detail imposed in the molding process. The direct application of the foam filler in the uncured state insures that the filler directly bonds to the cladding providing an integral structure face to face without significant hollows, for improved structural rigidity, having regard for the thin exterior cladding, and minimization of moisture traps. For the same reason, the aluminum foil is preferably applied to the polyurethane in the at least partially uncured state.

The cross-sectional design of the facing and hence the siding unit will vary with the conformation of the decorative face. Thus, in the case of cedar shake simulate in two adjacent courses, the cross section will comprise two generally wedge shaped sections juxtaposed in the same sequence, with the leading edge uppermost. The wedge ramp and, to some extent the wedge elevation will be irregular in shape as a result of the wood grain and texture being simulated, in the outer surface of the siding.

In essence, as shown in FIG. 8 of the drawings, the upper and lower edge regions 50 and 52 of the completed, i.e. molded and mechanically finished, vinyl siding unit 10 forms an interengageable dovetail or tongue-and-groove arrangement with respectively, similar upper and lower courses of vinyl siding mounted on the exterior of a home, and with the dovetailing configuration extending along the entirety of each edge and being molded into place in both the plastic cladding or outer facing layer 12 and the polyurethane foam filler 46. Thus, the upper edge 50 defined by the depth of groove 28, with the additional thickness of the material of the layer 12 and the aluminum foil backing 48 is molded to be equal to or slightly less in transverse thickness "X" than the dimension at the opposite or lower end 52 of the facing layer 12 defined by the internal width "Y" of the U-shaped portion 34 in its final bent-over and bonded condition with the bottom surface 44 of each of the transversely extending ribs 18 or as bonded to filler 46. This, in effect, will provide a vinyl siding construction which, in assembly, will bear similarities to that of the applicant's copending application Ser. No. 697,416. The vinyl siding unit 10 may be nailed to a sub-structure by suitably driving nails or other fasteners through the bottom of the groove 28. Thereafter, a further course of plastic vinyl siding 10 may be superimposed in dovetailed relationship as shown in FIG. 8 of the drawings by the phantom-lines.

Although the structure illustrated in FIGS. 1 and 5 of the drawings shows only a single projecting flange 30 extending outwardly of the side wall or 24, it becomes quite readily apparent that the vinyl siding structure 10 may be provided with complimentary end flanges and recesses, one centrally disposed at one end of the vinyl siding structure, and two spaced at opposite ends thereof, in a manner similar to that disclosed in applicant's copending application, to thereby provide positive connection with adjacent or contiguously located vinyl siding structures.

From the foregoing it thus becomes quite evident that there is formed a vinyl siding structure, or at least an exterior plastic cladding or outer facing layer, through an extremely simple and economical molding operation, followed by a mechanical bending step to finish the produced siding article, since the overlapping wall surfaces of the siding structure cannot be formed in a single molding step. Moreover, the siding structure incorporates a novel hinge lock arrangement which integrally molded therein to thereby facilitate the required reverse bending of a portion of the semi-finished siding structure into its finished configuration without subjecting the material of the outer facing layer to undue bending stresses, material deformation or wall thinning which could result in premature failure of the structure.

What is claimed is:

1. A method of manufacturing a self-supporting exterior facing layer of a thermoplastic polymer for use in an insulating siding unit for home installation, comprising the steps of:
   (a) molding a thin, uniformly thick sheet of thermoplastic polymer into a generally rectangular plank including a pattern of molded depressions and protuberances, and a flat plate extending into a generally U-shaped portion projecting outwardly of one edge of said plank;
   (b) concurrently molding an arcuate depression forming an integral hinge connection intermediate said projecting flat plate and said rectangular plank;
   (c) and subsequently bending said projecting flat plate and U-shaped portion in a negative arc about said arcuate depression into substantially folded relationship with said plank whereby said projecting flat plate and U-shaped portion overlies the edge of said plank to which it is joined.

2. A method as claimed in claim 1, said arcuate depression being integrally molded with said rectangular plank and said projecting flat plate.

3. A method as claimed in claim 1, said facing layer being formed into the shape of cedar shake shingles.

4. A method as claimed in claim 1, comprising forming said exterior facing layer through vacuum molding, and mechanically bending said flat plate about said arcuate depression through a negative angle into folded relationship with said plank.

5. A method as claimed in claim 1, said exterior facing layer having a thickness of about 25 to 45 mils.

6. A method as claimed in claim 1, said thermoplastic polymer being polyvinyl chloride.

7. A method as claimed in claim 1, comprising molding a plurality of transversely extending randomly spaced indentations into said plank forming recesses intermediate shake-like protuberances molded into said plank, said projecting flat plate being bent about said arcuate depression into surface contact with the bottom surfaces of said indentations.

8. A method as claimed in claim 7, comprising molding undirectional cedar shake-forming protuberances into said rectangular plank, said transversely extending randomly spaced indentations projecting out of the plane of said molded protuberances.

9. A method as claimed in claim 7, said indentations forming stiffening ribs extending across the width of said plank, comprising heat bonding said projecting flat plate to said stiffening ribs.

10. A method as claimed in claim 1, comprising pouring a hot foam filler material into recessed portions of said molded exterior facing layer subsequent to bending of said flat plate about said arcuate depression.

11. A method as claimed in claim 10, comprising bonding said flat plate to said foam filler.

12. A method as claimed in claim 10, said foam filler material comprising polyurethane.

13. A method as claimed in claim 10, said foam filler having a density of less than about 3.5 lbs./ft.$^2$.

14. A method as claimed in claim 10, comprising bonding a metallic foil backing layer to said filler.

15. A method as claimed in claim 14, said metallic foil backing layer comprising an aluminum foil of about 1 to 3 mil. thickness.

* * * * *